(12) United States Patent
Vallee et al.

(10) Patent No.: US 7,451,314 B2
(45) Date of Patent: Nov. 11, 2008

(54) CRYPTOGRAPHIC AUTHENTICATION PROCESS

(75) Inventors: Luc Vallee, Bretteville le Rabet (FR); Stéphane Petit, Herouville Saint Clair (FR)

(73) Assignee: France Telecom, Paris (FR)

( * ) Notice: Subject to any disclaimer, the term of this patent is extended or adjusted under 35 U.S.C. 154(b) by 547 days.

(21) Appl. No.: 10/481,914

(22) PCT Filed: Jun. 24, 2002

(86) PCT No.: PCT/FR02/02174

§ 371 (c)(1), (2), (4) Date: Dec. 23, 2003

(87) PCT Pub. No.: WO03/003649

PCT Pub. Date: Jan. 9, 2003

(65) Prior Publication Data

US 2004/0177252 A1  Sep. 9, 2004

(30) Foreign Application Priority Data

Jun. 27, 2001 (FR) .................................. 01 08502

(51) Int. Cl.
*H04L 9/00* (2006.01)
(52) U.S. Cl. ........................ 713/170; 713/169
(58) Field of Classification Search ................. 713/170, 713/169
See application file for complete search history.

(56) References Cited

U.S. PATENT DOCUMENTS

| | | | | |
|---|---|---|---|---|
| 5,473,689 A | | 12/1995 | Guenther | |
| 5,974,150 A | * | 10/1999 | Kaish et al. | 713/179 |
| 6,085,320 A | * | 7/2000 | Kaliski, Jr. | 713/168 |
| 6,115,821 A | * | 9/2000 | Newby et al. | 726/21 |
| 6,185,682 B1 | * | 2/2001 | Tang | 713/168 |
| 6,189,098 B1 | * | 2/2001 | Kaliski, Jr. | 713/168 |

(Continued)

FOREIGN PATENT DOCUMENTS

EP  0 506 637 A  9/1992

OTHER PUBLICATIONS

International Standard, "Information technology—Security techniques—Digital signature scheme giving message recovery", ISO/IEC 9796 (E): 1991.

(Continued)

*Primary Examiner*—Nasser G Moazzami
*Assistant Examiner*—David Garcia Cervetti
(74) *Attorney, Agent, or Firm*—Cohen Pontani Lieberman & Pavane LLP

(57) ABSTRACT

A cryptographic authentication method including a first step during which a first entity (A) to be authenticated sends an authenticator second entity (B) a message protected by a cryptographic algorithm and a secret key ($K_s$). During a second step, the second entity (B), after receiving said message, carries out operations selected from the group comprising completely verifying the authentication of the received protected message by means of said cryptographic algorithm and a verification key ($K_v$), delaying said complete verification, partly verifying said authentication, partly verifying said authentication and completing the verification subsequently, and omitting to verify said authentication. One of these operations is chosen as a function of the degree of certainty that the second entity (B) wishes to obtain as to the authentication of the first entity (A) and being concealed from the first entity (A).

9 Claims, 1 Drawing Sheet

U.S. PATENT DOCUMENTS

| | | | | |
|---|---|---|---|---|
| 6,263,447 | B1* | 7/2001 | French et al. | 726/5 |
| 6,282,658 | B2* | 8/2001 | French et al. | 726/7 |
| 6,321,339 | B1* | 11/2001 | French et al. | 726/2 |
| 6,330,624 | B1* | 12/2001 | Cromer et al. | 710/37 |
| 6,336,188 | B2* | 1/2002 | Blake-Wilson et al. | 713/171 |
| 6,349,338 | B1* | 2/2002 | Seamons et al. | 709/229 |
| 6,385,724 | B1* | 5/2002 | Beckman et al. | 713/167 |
| 6,487,665 | B1* | 11/2002 | Andrews et al. | 726/26 |
| 6,496,936 | B1* | 12/2002 | French et al. | 726/7 |
| 6,510,519 | B2* | 1/2003 | Wasilewski et al. | 713/168 |
| 6,571,337 | B1* | 5/2003 | Xiao | 713/194 |
| 6,604,198 | B1* | 8/2003 | Beckman et al. | 713/167 |
| 6,647,376 | B1* | 11/2003 | Farrar et al. | 705/45 |
| 6,772,336 | B1* | 8/2004 | Dixon, Jr. | 713/165 |
| 6,816,968 | B1* | 11/2004 | Walmsley | 713/168 |
| 6,957,339 | B2* | 10/2005 | Shinzaki | 713/186 |
| 7,134,018 | B2* | 11/2006 | Riordan | 713/170 |
| 7,187,771 | B1* | 3/2007 | Dickinson et al. | 380/228 |
| 7,197,642 | B2* | 3/2007 | Walmsley et al. | 713/168 |
| 7,213,149 | B2* | 5/2007 | Mache | 713/170 |
| 7,234,059 | B1* | 6/2007 | Beaver et al. | 713/170 |
| 7,234,156 | B2* | 6/2007 | French et al. | 726/2 |
| 7,251,729 | B1* | 7/2007 | Park | 713/168 |
| 2001/0001877 | A1* | 5/2001 | French et al. | 713/182 |
| 2001/0002929 | A1* | 6/2001 | Mache | 380/247 |
| 2002/0066016 | A1* | 5/2002 | Riordan | 713/170 |
| 2002/0120847 | A1* | 8/2002 | Kamperman | 713/170 |
| 2002/0128977 | A1* | 9/2002 | Nambiar et al. | 705/64 |
| 2002/0138728 | A1* | 9/2002 | Parfenov et al. | 713/64 |
| 2002/0157029 | A1* | 10/2002 | French et al. | 713/202 |
| 2002/0174346 | A1* | 11/2002 | Ting | 713/186 |
| 2003/0005310 | A1* | 1/2003 | Shinzaki | 713/186 |
| 2003/0046128 | A1* | 3/2003 | Heinrich | 705/7 |
| 2004/0221045 | A1* | 11/2004 | Joosten et al. | 709/227 |
| 2005/0005117 | A1* | 1/2005 | Wheeler et al. | 713/170 |
| 2005/0033960 | A1* | 2/2005 | Vialen et al. | 713/170 |
| 2005/0114186 | A1* | 5/2005 | Heinrich | 705/7 |

OTHER PUBLICATIONS

R.L. Rivest, et al., "A Method for Obtaining Digital Signatures and Public-Key Cryptosystems", CACM, vol. 21, No. 2, pp. 120-126, Feb. 1978.

A. Fiat, et al., "How to Prove Yourself: Practical Solutions to Identification and Signature Problems", Crypto'86, pp. 186-194, Springer Verlag, Berlin, 1987.

N. Haller, et al., "A One-Time Password System", RFC 2289, Bellcore, Kaman Sciences Corporation, Nesser and Nesser Consulting, pp. 1-19, Feb. 1998.

L. Guillou et al., "A Practical Zero-Knowledge Protocol Fitted to Security Microprocessor Minimizing both Transmission and Memory", Eurocrypt '88, pp. 123-128, Springer-Verlag, Berlin, 1988.

* cited by examiner

CRYPTOGRAPHIC AUTHENTICATION PROCESS

This is a U.S. national stage of International application no. PCT/FR02/02174 filed on Jun. 24, 2002.

FIELD OF THE INVENTION

The present invention relates to a cryptographic authentication method involving a first entity to be authenticated and an authenticator second entity.

This kind of method enables any kind of medium, referred to as an authentication module (for example a memory card, a microprocessor, software installed on a computer, etc.), to prove its identity to verification means contained in a server, for example, using a protocol employing one or more secrets contained in the medium, but without revealing them.

The invention relates more particularly to a cryptographic authentication method including a first step during which a first entity to be authenticated sends an authenticator second entity a message protected by a cryptographic algorithm and a secret key.

BACKGROUND OF THE INVENTION

Methods of the above type are known in the art, in particular the Rivest, Shamir, Adleman (RSA) public key signature authentication method (see for example the paper by R. RIVEST, A. SHAMIR and L. ADLEMAN "A method for obtaining digital signatures and public key cryptosystems", CACM, Vol. 21, No. 2, pp. 120-126, February 1978) and methods using the digital signature algorithm (DSA).

When such methods are used, the authenticator entity does not need to know the secrets contained in the identity module of the entity to be authenticated, only non-confidential data (the public key), which it uses to perform a fixed quantity of verification computations, after which the authenticator entity produces a binary response, i.e. "entity authenticated" or "entity not authenticated". The level of security and the costs of the computations used by these methods depend on the length of the keys employed, which can vary from 512 to 1024 bits. Thus if the authenticator entity requires the highest possible certainty as to the authenticity of the entity to be authenticated, the size of the keys used in the authentication method could be 1024 bits, for example. But, if the authenticator entity relaxes its certainty constraints, then the authentication method can be executed with a smaller key, for example 512 bits or 768 bits.

The above methods have the drawback of obliging the entity to be authenticated to modify the size of its key as a function of the degree of certainty required by the authenticator entity.

There are also cryptographic authentication methods known as zero knowledge methods, such as the Fiat-Shamir method (see, for example, the paper by A. FIAT and A. SHAMIR "How to prove yourself: practical solutions to identification and signature problems", CRYPTO'86, pp. 186-194, Springer Verlag, Berlin, 1987) and the Guillou-Quisquater method (see, for example, the paper by L. GUILLOU and J-J. QUISQUATER "A practical zero-knowledge protocol fitted to security microprocessor minimizing both transmission and memory", EUROCRYPT'88, pp. 123-128, Springer Verlag, Berlin, 1988). These methods repeat the following triplet one or more times:

the entity to be authenticated generates a random value and sends the authenticator entity an initial engagement depending on it, the authenticator entity sends the entity to be authenticated a question Q which is generally a random value, the entity to be authenticated uses its secret identification key to compute a response R to the question Q as a function of the initial engagement previously sent, and sends that response to the authenticator entity.

The authenticator entity verifies the consistency of the initial engagement, the question Q and the response R, using the public key disclosed by the entity to be authenticated.

During this process, the authenticator entity fixes a number t of iterations of the above triplet. By repeating the triplet t times, the authenticator entity acquires the conviction that the entity to be authenticated is not an impostor with a probability that increases with t and tends towards 1. The authenticator entity can then modulate the quantity of verification computations as a function of the degree of certainty that it will accept for the authentication by choosing the number t of times the above triplet is iterated. This kind of modulation has the drawback of being visible to the entity to be authenticated, which can readily deduce the risk that the authenticator entity will accept from the number t of times that the authenticator entity sends it the question Q.

In other cryptographic authentication methods known in the art only some of the information on the entity to be authenticated is revealed to the authenticator entity. An example of this kind of method is described in the paper by F. BOUDOT "Preuves d'égalité, d'appartenance á un intervalle et leurs applications" ["Proofs of equality, of belonging to a range, and applications thereof"], Ph.D. thesis, Caen University, 25 Sep. 2000. The drawback of this method is that the authenticator entity is bound by the information that the entity to be authenticated wishes to reveal to it. This also makes this kind of method less secure.

Also known in the art are cryptographic authentication methods in which the verification computations performed by the authenticator entity are minimized. This is the case with the secure sockets layer (SSL) protocol, for example (see for example the Netscape Communications Corp. document "The SSL Protocol Version 3.0, Internet Draft", March 1996, which can be consulted at the following URL: home.netscape.com/eng/ssl3. The SSL protocol is designed to assure confidentiality between an entity to be authenticated, usually a web client, and an authenticator entity, usually a web server. A first step of this protocol, at the time of opening a SSL session, consists of validating data transfer during which the client and the server:

choose a public key cryptographic algorithm and the length of the key used, and negotiate session keys.

During a second step, once transmission of application data begins, all the data is authenticated using a secret key algorithm and the session keys negotiated during the validation phase, the aim of this encryption being to authenticate exchanges between the client and the server.

The drawback of the SSL protocol is that it requires two very different encryption algorithms, which makes the computations lengthy and costly. Also, the server cannot vary the verification computation steps.

There are also methods known as biometric methods which identify a person on the basis of physiological characteristics (fingerprints, shape of the hand, lines of the face, pattern of the network of veins in the eye, the voice, etc.) or behavioral traits (speed and acceleration of pen movements, pressure applied, slant, etc.) which can be recognized and verified automatically.

The drawback of methods of this type is that they are not suitable for authenticating an entity such as a computer, for example, or for authenticating messages. Moreover, although thresholds are routinely used to adjust the authentication error risk, complete elimination of the risks of imposture leads to a non-zero risk of rejecting a legitimate entity to be authenticated.

SUMMARY OF THE INVENTION

An object of the present invention is to remedy the drawbacks previously cited.

To this end, the cryptographic authentication method according to the invention includes the above-mentioned first step followed by a second step during which the second entity, after receiving said message, carries out an operation selected from the group comprising:

- completely verifying the authentication of the received protected message by means of said cryptographic algorithm and a verification key,
- delaying complete verification of the authentication of said protected message,
- partly verifying the authentication of the received protected message by means of said cryptographic algorithm and said verification key,
- partly verifying the authentication of the received protected message by means of said cryptographic algorithm and said verification key and completing the verification subsequently, and
- omitting to verify the authentication of said protected message.

The operation carried out by the second step is selected from among the group of operations as a function of the degree of certainty that the second entity wishes to obtain as to the authentication of the first entity and is concealed from the first entity.

Thus, at the time of authenticating the entity to be authenticated, the authenticator entity can choose the degree of certainty that it requires, which can be related to an error risk management policy, its choice being totally transparent for the entity to be authenticated.

Preferred embodiments of the method according to the invention include one or more of the following features:

- the cryptographic algorithm is a public key algorithm;
- the cryptographic algorithm is an RSA algorithm in which the public key is a function of a modulus;
- the protected message has a length that is at most equal to half the modulus of said public key;
- the cryptographic algorithm is a DSA algorithm;
- the cryptographic algorithm is a zero knowledge algorithm;
- the cryptographic algorithm is a secret key algorithm;
- the first entity is a client and the second entity is a server.

The present invention also provides a server employed in the method according to the invention, said server being characterized in that it includes:

- first verification means able to verify completely the authentication of the received protected message by means of said cryptographic algorithm and a verification key,
- second verification means able to verify partially the authentication of the received protected message by means of said cryptographic algorithm and said verification key,
- a database containing one or more parameters assigned a risk value, and
- switching means for switching received protected messages to the first verification means or to the second verification means as a function of comparing the content of the received protected messages and a parameter or parameters from the data base.

The above kind of server therefore offers faster management of the processing of received protected messages and a shorter response time to the entity to be authenticated.

BRIEF DESCRIPTION OF THE DRAWINGS

Other features and advantages of the invention will become apparent in the course of the following description of embodiments of the method and one embodiment of the server, which is represented in the single figure (FIG. 1) of the accompanying drawing, which is provided by way of non-limiting example.

DETAILED DESCRIPTION OF THE DRAWING

First Embodiment

Figure 1:
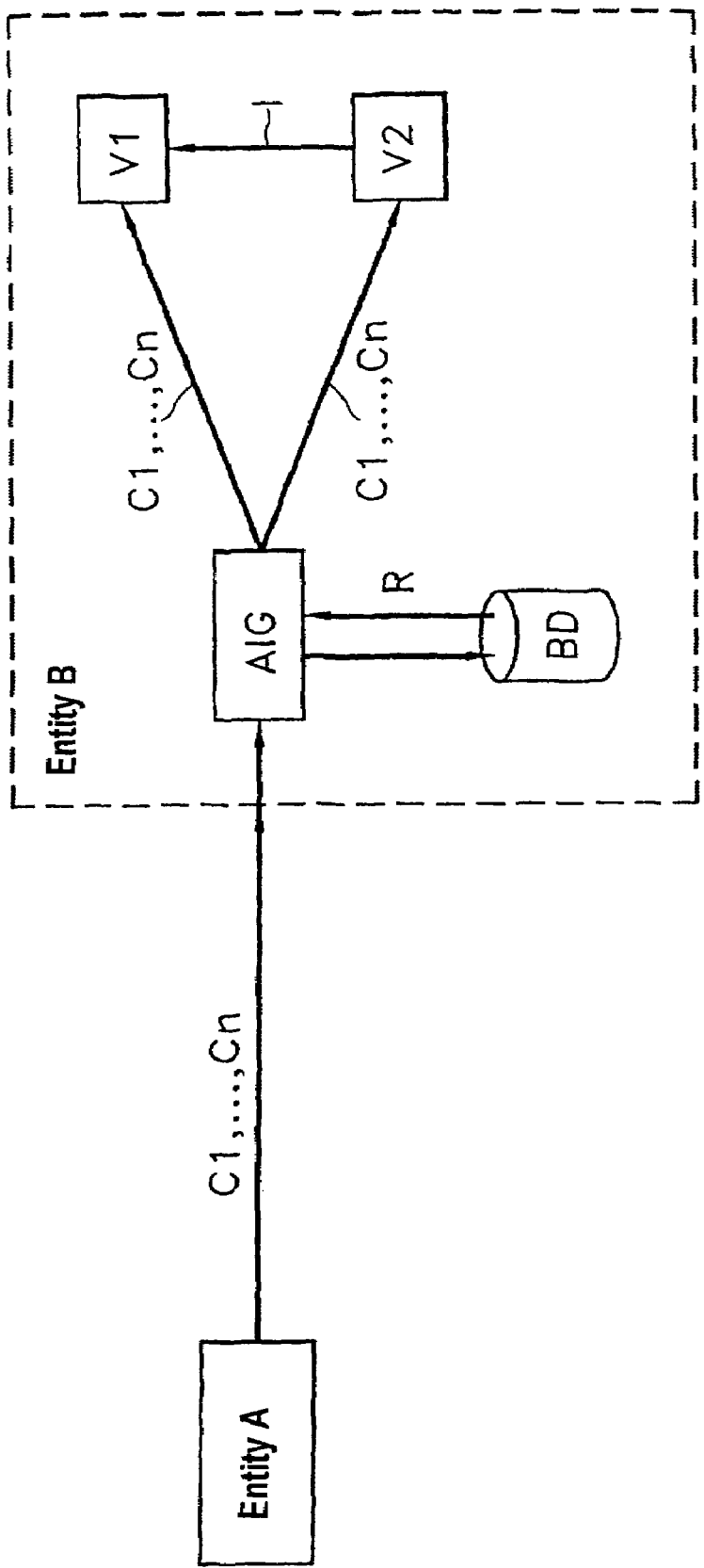
FIG. 1, the only drawing, depicts a schematic block diagram of components arranged to implement the present invention.

A first embodiment of the cryptographic authentication method is a DSA or RSA method.

The method in question lends itself particularly well to a situation in which an entity A to be authenticated needs to send a signed message to an authenticator entity B by means of an electronic card, for example, in which case the authenticator entity B includes a device for verifying the card, for example. The method also lends itself to electronic transactions during which the entity A to be authenticated needs to sign the transaction so that it can be verified first by the verification device B in which the transaction is processed.

The signature is an electronic signature which is conventionally computed using a series of computation rules defined by the RSA algorithm and a set of parameters. As is known in the art, the signature guarantees the identity of the signatory (because it employs a secret exponent specific to the signatory) and the integrity of the signed message (because it uses the message itself). This kind of algorithm generates and authenticates signatures.

The RSA signature is generated using a secret exponent. Authentication uses a public exponent which corresponds to the secret exponent but is not identical to it. Each user has a secret exponent and a public exponent. The public exponents can be known to everyone, but the secret exponents are never revealed. Anyone can verify the signature of a user by means of the latter's public exponent, but only the possessor of the secret exponent can generate a signature corresponding to the pair of exponents (secret and public).

To be more precise, the electronic card of the entity A to be authenticated includes a memory in which is stored a public key $K_v$ used to authenticate electronic messages and possibly a secret key $K_s$ used to sign electronic messages, both keys consisting of strings of numerical characters stored in the memory.

To be more precise, as is known in the art, the public key $K_v$ includes two integers referred to as the public modulus n and the public exponent v and the secret key $K_s$ includes an integer number called the secret exponent s.

The first two numbers n and v can be read from the electronic card on which they are stored. On the other hand, the secret exponent s is stored in a protected area of the card which cannot be read from the outside. Only the protected computation circuits of the card can read the secret exponent s.

In an RSA authentication method according to the invention, during a step 1 preceding the signing of a message M, the entity A to be authenticated preferably applies to the message a hashing algorithm known in the art, for example one using the SHA-1 hashing function, hereinafter denoted h. The result obtained is then a message condensate H=h(v, M).

The advantage of hashing is that it makes the signature and authentication method more secure.

During a step 2, the electronic card of the entity A to be authenticated performs the following computation to obtain the signature S of the message condensate H:

$$H^v \bmod(n) = h(v, M)^s \bmod(n) = S$$

During a step 3, the entity A sends the verification device B the condensate C of the message M and its signature S: C=(M, S).

During a step 4, the verification device B reads from the card of the entity A to be authenticated the parameters n and v that were used to compute the signature S.

During a step 5, the verification device computes a message M'=$S_v$modulo(n) from the signature S and then computes a hashed value of M' by applying the hashing function h to obtain a message condensate:

$$H' = h(v, M') = h(v, S^v \bmod(n)).$$

Finally, during a step 6, the verification device authenticates the signature S by verifying that the condensate H' is consistent with the condensate H received. This consistency depends on the modulus n of the public key used.

For example, if the modulus n of the public key has a format conforming to the PKCS#1 public-key cryptography standard, the verification device verifies that the message M' conforms to the following format:

$$02|R|00|H'$$

in which 00 and 02 are two bytes, R is a string of random bytes whose length is fixed so that M' has a length equal to that of the public modulus n, and the symbol | symbolizes the concatenation operator.

If the public key used is a DSA key, for example, associated with the SHA hashing function, the verification device verifies that H'=H.

In the modified method in accordance with the invention using the PKCS#1 standard:

A) if the entity B wishes to have a zero degree of certainty as to the authentication of the entity A, it merely sends the entity A, via its verification device, a message acknowledging authentication of the entity A;

B) if the verification device of the entity B is not in a position to authenticate the entity A in real time, the entity B:

I. delays complete verification of the authentication of the entity A and sends the entity A anyway, via its verification device, a message acknowledging authentication of the entity A, or II. partly verifies the authentication of the entity A, this verification being applied only to all of, or even only to some of, the useful bits of M', i.e. the bits of H', the entity B then sending the entity A, via its verification device, a message acknowledging authentication of the entity A if the result of the verification is positive, or III. partly verifies the authentication of the entity A as above and then, if it nevertheless wishes to obtain a higher degree of certainty as to the entity A, completes the verification subsequently by comparing the bits of the string 02|R|00 of the message M', C) if the entity B wishes to have an optimum degree of certainty as to the authentication of the entity A, it verifies all the bits of the message M' and sends the entity A, via its verification device, a message acknowledging authentication of the entity A if the result of the verification is positive.

In the modified method in accordance with the invention using the DSA public key and the SHA hashing function:

A) if the entity B wishes to have a zero degree of certainty as to the authentication of the entity A, it merely sends the entity A, via its verification device, a message acknowledging authentication of the entity A;

B) if the verification device of the entity B is not in a position to authenticate the entity A in real time, the entity B:

I. delays complete verification of the authentication of the entity A and sends the entity A anyway, via its verification device, a message acknowledging authentication of the entity A, or II. partly verifies the authentication of the entity A, by comparing only the first bits of the terms of the equation H=H', the entity B then sending the entity A, via its verification device, a message acknowledging authentication of the entity A if the result of the verification is positive, or III. partly verifies the authentication of the entity A as above and then, if it nevertheless wishes to obtain a higher degree of certainty as to the entity A, completes the verification subsequently by comparing the bits of the terms of the equation H=H', C) if the entity B wishes to have an optimum degree of certainty as to the authentication of the entity A, it compares all the bits of the terms of the equation H=H' and sends the entity A, via its verification device, a message acknowledging authentication of the entity A if the result of the verification is positive.

Second Embodiment

A second embodiment of the cryptographic authentication method is an RSA method conforming to the international standard ISO/IEC 9796 (see the ISO document "Digital Signature scheme giving message recovery" ISO/IEC 9796(E): 1991, 1991). This standard describes how messages are formed before they are signed by the RSA algorithm. It allows at most half of the bits of a message to be information bits, the remaining bits being redundant bits. The information bits concerned are the bits of one half of the modulus n of the public key $K_v$ used.

In this second embodiment, a hashing algorithm is used whose results are much smaller than half of the modulus n.

The method proceeds in the following manner:

During a step 1, the entity A to be authenticated makes the message M that it wishes to send to the entity B redundant so as to obtain a message IR comprising a succession of messages M whose last byte is followed by a redundant byte and possibly by forcing bits whose function is to mark the length of the message M.

During a step 2, the entity A computes the signature C=IR$^s$ mod n.

During a step 3, the entity A sends the cryptogram C to the verification device of the authenticator entity B.

During a step 4, the verification device of the authenticator entity B uses the public key $K_v$ and the received cryptogram C to compute: IR'=C$^v$ mod(n).

Finally, during a step 5, the verification device authenticates the entity A by verifying the equation IR=IR'.

In the modified method according to the invention:
A) if the entity B wishes to have a zero degree of certainty as to the authentication of the entity A, it merely sends the entity A, via its verification device, a message acknowledging authentication of the entity A;
B) if the verification device of the entity B is not in a position to authenticate the entity A in real time, the entity B:
I. delays complete verification of the authentication of the entity A and sends the entity A anyway, via its verification device, a message acknowledging authentication of the entity A, or
II. partly verifies the authentication of the entity A, by verifying the equation IR=IR' over a limited number of bytes, the entity B then sending the entity A, via its verification device, a message acknowledging authentication of the entity A if the result of the verification is positive, or
III. partly verifies the authentication of the entity A as above and then, if it nevertheless wishes to obtain a higher degree of certainty as to the entity A, completes the verification subsequently by verifying the equation IR=IR' for the remaining bytes,
C) if the entity B wishes to have an optimum degree of certainty as to the authentication of the entity A, it verifies the equation IR=IR' for all of the bits and sends the entity A, via its verification device, a message acknowledging authentication of the entity A if the result of the verification is positive.

Third Embodiment

In a third embodiment, the cryptographic authentication method is the FIAT-SHAMIR method or the GUILLOU-QUISQUATER method.

a) FIAT-SHAMIR Method
Conventionally:
the public key $K_v$ used is an integer less than a large non-prime integer n, which is known only to a confidence authority whose role is to compute the secret keys of the users of the method,
the private key $K_s$ of the entity A to be authenticated produced by the confidence authority is such that $K_v = K_s^2$ mod n.

The basic method is as follows:
1) The entity A to be authenticated chooses at random an integer r in the range $\{0 \ldots n\}$,
2) The entity A computes an engagement $x = r^2 \bmod n$ and sends it to the authenticator entity B,
3) The entity B chooses a random bit e and sends it to the entity A,
4) The entity A computes the response $C = r.K_s.e$ and sends it to the entity B,
5) The entity B verifies that $C^2 = x.K_v.e \bmod n(\alpha)$.

The entity A authenticates itself to the entity B by repeating the above steps t times.

In the modified method according to the invention:
A) if the entity B wishes to have a zero degree of certainty as to the authentication of the entity A, it merely sends the entity A, via its verification device, a message acknowledging authentication of the entity A,
B) if the verification device the entity B is not in a position to authenticate the entity A in real time, the entity B:
I. delays complete verification of the authentication of the entity A and sends the entity A anyway, via its verification device, a message acknowledging authentication of the entity A, or II. partly verifies the authentication of the entity A, verifying only p relations ($\alpha$) for $0 \leq p \leq t$, the entity B then sending the entity A, via its verification device, a message acknowledging authentication of the entity A if the result of the verification is positive, or
III. partly verifies the authentication of the entity A as above and then, if it nevertheless wishes to obtain a higher degree of certainty as to the entity A, completes the verification subsequently by verifying the remaining t-p relations ($\alpha$),
C) if the entity B wishes to have an optimum degree of certainty as to the authentication of the entity A, it verifies the t relations ($\alpha$) and sends the entity A, via its verification device, a message acknowledging authentication of the entity A if the result of the verification is positive.

b) GUILLOU-QUISQUATER Method
Conventionally:
the public key $K_v$ used is an integer less than a large non-prime integer n, which is known only to a confidence authority whose role is to compute the secret keys of the users of the method,
the private key $K_s$ of the entity A to be authenticated produced by the confidence authority is such that $K_v = K_s^h$ mod n.

The basic method is as follows:
1) The entity A to be authenticated chooses at random an integer r in the range $\{0 \ldots n\}$, 2) The entity A computes an engagement $x = r^2 \bmod n$ and sends it to the authenticator entity B,
3) The entity B chooses a random bit e and sends it to the entity A,
4) The entity A computes the response $C = r.K_s.e$ and sends it to the entity B,
5) The entity B verifies that $x = C^h.K_v.e \bmod n(\beta)$.

The entity A authenticates itself to the entity B by repeating the above steps t times.

In the modified method according to the invention:
A) if the entity B wishes to have a zero degree of certainty as to the authentication of the entity A, it merely sends the entity A, via its verification device, a message acknowledging authentication of the entity A,
B) if the verification device of the entity B is not in a position to authenticate the entity A in real time, the entity B:
I. delays complete verification of the authentication of the entity A and sends the entity A anyway, via its verification device, a message acknowledging authentication of the entity A, or
II. partly verifies the authentication of the entity A, verifying only p relations ($\beta$) for $0 \leq p \leq t$, the entity B then sending the entity A, via its verification device, a message acknowledging authentication of the entity A if the result of the verification is positive, or
III. partly verifies the authentication of the entity A as above and then, if it nevertheless wishes to obtain a higher degree of certainty as to the entity A, completes the verification subsequently by verifying the remaining t-p relations ($\beta$),
C) if the entity B wishes to have an optimum degree of certainty as to the authentication of the entity A, it verifies the t relations ($\beta$) and sends the entity A, via its verification device, a message acknowledging authentication of the entity A if the result of the verification is positive.

In both the variants described above, the entity A to be authenticated must see the accept/reject decision taken by the authenticator entity B as soon as possible after receiving the $t^{th}$ response C. However, as described in paragraphs A) and B)I to B)III above, the actual decision of the authenticator entity B can be taken earlier and allowing for anticipated actions, such as the preparation of a response to the entity to be authenticated, for example a dynamic HTML page if the entity A is a client and the entity B is a server. This offers the entity B a non-negligible time saving in processing requests from the entity A.

Fourth Embodiment

In a fourth embodiment of the cryptographic authentication method a secret key $K_s$ is shared between the entity A to be authenticated and the authenticator entity B.

The basic method is as follows:

1) The entity A to be authenticated generates the key $K_s$ in a manner that is known in the art and sends the authenticator entity B a copy of the key $K_s$, for example via a secure communication channel. The key $K_s$ can instead be sent implicitly by synchronizing, firstly, a clock, counter or automaton specific to the entity A for generating random bit strings and, secondly, a clock, counter or automaton specific to the entity B for generating random bit strings.

2) The entity A protects a message M in clear using a selected cryptographic algorithm E and the key $K_v$, thereby obtaining a message C such that $C=E(M, K_v, D)$, where D is a data item that changes on each authentication. Depending on which option is chosen, the data item is a time value delivered by the clock of the entity A, a counter value delivered by the counter of the entity A or a random bit string delivered by the automaton of the entity A.

3) The entity A sends the message C, M (and where applicable D) to the entity B.

4) The entity B computes a message $C'=E(M, K_s, D)$ and verifies the equation $C=C'$.

In the modified method according to the invention:

A) if the entity B wishes to have a zero degree of certainty as to the authentication of the entity A, it merely sends the entity A, via its verification device, a message acknowledging authentication of the entity A;

B) if the verification device of the entity B is not in a position to authenticate the entity A in real time, the entity B:

I. delays complete verification of the authentication of the entity A and sends the entity A anyway, via its verification device, a message acknowledging authentication of the entity A, or II. partly verifies the authentication of the entity A, verifying the equation $C=C'$ on a limited number of bits, the entity B then sending the entity A, via its verification device, a message acknowledging authentication of the entity A if the result of the verification is positive, or III. partly verifies the authentication of the entity A as above and then, if it nevertheless wishes to obtain a higher degree of certainty as to the entity A, completes the verification subsequently by verifying the equation $C=C'$ on the remaining bits, C) if the entity B wishes to have an optimum degree of certainty as to the authentication of the entity A, it verifies the equation $C=C'$ for all the bits and sends the entity A, via its verification device, a message acknowledging authentication of the entity A if the result of the verification is positive.

In this embodiment, partial verification of the equation $C=C'$ is possible because the message C is long, because of cryptanalysis constraints.

Fifth Embodiment

In a fifth embodiment of the cryptographic authentication method disposable passwords are exchanged between the entity A and the entity B. This kind of method is described in the paper by N. HALLER, C. METZ, P. NESSER and M. STRAC "A One-Time Password System", RFC 2289, Bellcore, Kaman Sciences Corporation, Nesser and Nesser Consulting, February 1998, for example.

The basic method is as follows:

1) The entity A to be authenticated and the authenticator entity B set a parameter n representative of the length of the strings of passwords that they wish to exchange.

2) The entity A generates a random password $C_n$ using a software automaton.

3) For $1 \leq i \leq n$, the entity A computes a string of passwords $C_{i-1}=h(C_i)$ where h is a hashing function, $C_{i-1}$ serves as a public key $K_v$ and $C_i$ serves as a secret key $K_s$.

4) The entity A sends $C_0$ to the entity B, to serve as a public key $K_v$.

5) The entity A sends $C_1$ to the entity B.

6) The entity B computes $h(C_1)$ and verifies that $h(C_1)=C_0$.

6+n) The entity A sends $C_n$ to the entity B.

7+n) The entity B computes $h(C_n)$ and verifies that $h(C_n)=C_{n-1}$.

In the modified method according to the invention:

A) if the entity B wishes to have a zero degree of certainty as to the authentication of the entity A, it merely sends the entity A, via its verification device, a message acknowledging authentication of the entity A;

B) if the verification device of the entity B is not in a position to authenticate the entity A in real time, the entity B:

I. delays complete verification of the authentication of the entity A and sends the entity A anyway, via its verification device, a message acknowledging authentication of the entity A, or II. partly verifies the authentication of the entity A, by verifying, during an $i^{th}$ step, the equation $h(C_i)=C_{i-1}$ over a limited number of bits, the entity B then sending the entity A, via its verification device, a message acknowledging authentication of the entity A if the result of the verification is positive, or III. partly verifies the authentication of the entity A as above and then, if it nevertheless wishes to obtain a higher degree of certainty as to the entity A, completes the verification subsequently by verifying firstly the equation $h(C_i)=C_{i-1}$ for the remaining bits and then by verifying the respective equations $h(C_{i+1})=C_i, \ldots, h(C_n)=C_{n-1}$ for all the bits, C) if the entity B wishes to have an optimum degree of certainty as to the authentication of the entity A, it verifies the respective equations $h(C_1)=C_0, h(C_2)=C_1, \ldots, h(C_n)=C_{n-1}$ for all the bits and sends the entity A, via its verification device, a message acknowledging authentication of the entity A if the result of the verification is positive.

The advantage of the five embodiments described above is that, regardless of the authentication policy envisaged by the authenticator entity B, the verification computations are effected locally in the verification device of the entity B, the choice of the degree of certainty of the entity B therefore being completely concealed from the entity A, which is content to receive systematically, after sending its message protected by the cryptographic algorithm, a message acknowledging the result of its authentication. Where the entity B is concerned, this results in a faster response to the entity A. The entity A is therefore much less tempted to break off the connection to the entity B, since it systematically receives from the entity B a message acknowledging its authentication, regardless of the degree of certainty of the verification computations effected by the entity B.

For the entity B to be able to modulate the verification computations, the verification device of the entity B includes first verification means V1 adapted to verify completely any message C1, C2, . . . , Cn protected by a cryptographic algorithm received from the entity A (see FIG. 1). The verification device further includes second verification means V2 adapted to verify partially any message C1, C2, . . . , Cn.

The verification means V1 and V2 are computation modules programmed in accordance with the cryptographic algorithms used in the five embodiments described above. Also, the verification means V2 are programmed according to the degree of certainty in respect of the verification that the entity B requires.

The verification device of the entity B further includes a software module AIG designed to switch the messages C1, C2, . . . , Cn received by the entity B automatically to the verification means V1 or to the verification means V2 as a function of an authentication policy decided on in real time by the entity B. To this end, the verification device includes a database manegement system (for example Oracle, DB2, MSSQL) which includes a database BD and comparator means. Database BD stores the following parameters:

- a type for the entity A: linked to the entity B by an agreement, occasional, unknown;
- a type for the service or information requested, and for the logic in the stringing of the messages C1, C2, . . . , Cn sent to the entity B;
- the time elapsed or the number of connections since the last complete authentication of the entity A;
- predicted or acquired knowledge of the usual behavior of the entity A and its current behavior, for example in terms of purchases and payments;
- the cost of information or service to be paid for;
- the cumulative total of pending payments, or any other information of a financial nature.

Each of the above parameters is allocated a risk value RV. Likewise the following contextual elements:

- the load of the entity B (number of connections, bit rate, variety of protocols used, etc.);
- the exchange context: access network, geographical origin of the connection set up by the entity A, time band, day, etc.

The above-mentioned comparator means compares the nature of the content of the messages C1, C2, . . . , Cn received with the above parameters to allocate each content a risk value RV.

If the risk value is less than or equal to a first threshold value x1, the software module AIG inhibits activation of the verification means V1, V2. For example, if message C1 concerns the identity of entity A which is linked to entity B by an agreement, the allocated risk value will be in accordance with this option because entity B has a high degree of certainty about entity A.

If the risk value is greater than or equal to a second threshold value x2>x1, the software module AIG switches the messages C1, C2, . . . , Cn to the verification means V1.

If $x1 \leq R \leq x2$, the software module AIG switches the messages C1, C2, . . . , Cn to the verification means V2.

The three just-mentioned options constitute the authentication policy.

As shown in FIG. 1, an interface I is provided between the verification means V1 and V2 to implement the option B.III described above for the five embodiments, i.e. to send the verification means V1, at a time chosen by the entity B, the messages C1, C2, . . . , Cn partly verified in the verification means V2, for the verification means V1 to complete the partial verification. Interface I can be a classical function call which allows the transmission of data included in the messages, partially verified in computation means V2, to computation means V1. V1 completes the verification. Alternatively, interface I can allow the transmission of intermediate results, obtained in V2, to V1. V1 then completes the verification for messages that have not been verified in V2.

APPLICATIONS

A first application of the present invention is to controlling access to interactive services using different communication networks, including the Internet, cable TV, asymmetric digital subscriber lines (ADSL), etc.

In this case, the authenticator entity B is a server or service provider and the entity A to be authenticated is a client of the server or service provider. The client A is provided with telecommunication equipment connected by a secure telecommunication channel to the entity B if it is a server or to a telecommunication equipment belonging to the entity B if it is a service provider.

The above interactive services offer information, and conditions for access to that information vary in terms of cost, public character, confidentiality, etc. and lead to many exchanges between the client A and the server or service provider B, which enables the latter to acquire some knowledge of the client A and therefore of the associated risks. Finally, the server B is designed to choose an authentication policy that takes account of the compromise between the quality of service offered and the degree of security.

Accordingly, the server or service provider B can modulate the authentication of the client A and/or delay the more refined verification of its identity in accordance with the following criteria:

- a type for the entity A: registered user of the service B, occasional, unknown;
- the current behavior of the entity A and its known usual behavior;
- the type of service or information requested and the logic in the stringing requests;
- the load of the server (number of connections, bit rate, variety of protocols used, etc.);
- the time elapsed or the number of connections since the last complete authentication of the client A;
- the exchange context: access network, geographical origin of the connection, time band, day, etc.

A second application of the present invention is to electronic funds transfer, to prevent the cost of the authentication computations being too high in relation to the amount of the payment and the risk of loss through false authentication, in order to improve the economic viability of the payment service.

In this case, the authenticator entity B is a server or service provider to be paid and the entity A to be authenticated is a client of the server or service provider B. The client A is provided with telecommunication equipment connected by a secure telecommunication channel to the entity B if it is a server or to a telecommunication equipment belonging to the entity B if it is a service provider.

The above kind of electronic funds transfer generates services or information whose unit cost is low (for example of the order of 0.1 Euros). Furthermore, because of the logic of the stringing of the services or information, it leads to many transfers of funds, which enables the server or service provider B to acquire some knowledge of the client A and therefore the associated risks. Finally, if the entity B is a server, it is designed to opt for an authentication policy that takes account of the compromise between the quality of service offered and the degree of security, in particular so as not to discourage "impulse purchases".

Accordingly, the server or service provider B can modulate the authentication of the client A and/or delay the more refined verification of its identity in accordance with the following criteria:

a type for the client A: registered user of the server B, occasional, unknown;

predicted or acquired knowledge of the usual behavior of the client A and its current behavior in terms of purchases and payments;

the type of service or information requested and the logic in the stringing of requests;

the cost of information or service to be paid for;

the cumulative total of pending payments or any other information of a financial nature;

the time elapsed, the cumulative amount or the number of connections since the last complete authentication of the client A;

the server load (number of connections, bit rate, variety of protocols used, etc.);

the exchange context: access network, payment means used, geographical origin of the connection, time band, day, etc.

The invention claimed is:

1. A cryptographic authentication method, comprising:

sending from a first entity to be authenticated to an authenticator second entity a message protected by a cryptographic algorithm and a secret, said authenticator second entity being in communication with a database containing at least one parameter having an assigned risk value and switching means for switching received protected messages to one of a first verification means and a second verification means based on a comparison of content of the received protected messages to the at least one parameter from the database;

performing an operation by said authenticator second entity, after receiving said message, said operation being selected from the group comprising:

completely verifying the authentication of the received protected message via the first verification means which includes said cryptographic algorithm and a verification key;

delaying complete verification of the authentication of said protected message;

partially verifying the authentication of the received protected message via said cryptographic algorithm and said verification key;

partially verifying the authentication of the received protected message via the second verification means which includes said cryptographic algorithm and said verification key and subsequently completing the verification; and omitting verification of the authentication of said protected message;

wherein the operation performed by said authenticator second entity from said group of operations is selected as a function of a degree of certainty that the second entity wishes to obtain as to the authentication of the first entity based on the received messages of said switching means which is configured to switch the received protected messages to one of the first verification means and the second verification means based on the comparison of the content of the received protected messages to the at least one parameter from the database, and wherein the operation is concealed from the first entity.

2. The method according to claim 1, wherein the cryptographic algorithm is a public key algorithm.

3. The method according to claim 2, wherein the cryptographic algorithm is an RSA (Rivest, Shamir, Adelman) algorithm in which the public key is a function of a modulus.

4. The method according to claim 3, wherein the protected message has a length that is at most equal to half the modulus of said public key.

5. The method according to claim 2, wherein the cryptographic algorithm is a DSA (Digital Signature Algorithm) algorithm.

6. The method according to claim 2, wherein the cryptographic algorithm is a zero knowledge algorithm.

7. The method according to claim 1, wherein the cryptographic algorithm is a secret key algorithm.

8. The method according to claim 1, wherein the first entity is a client and the second entity is a server.

9. A server, comprising:

first verification means configured to completely verify authentication of a received protected message based on a cryptographic algorithm and a verification key;

second verification means configured to partially verify the authentication of the received protected message based on said cryptographic algorithm and said verification key;

a database containing one or more parameters assigned a risk value; and switching means for switching received protected messages to one of the first verification means and the second verification means based on a comparison of content of the received protected messages to at least one parameter from the database.

* * * * *